United States Patent Office 3,510,497
Patented May 5, 1970

3,510,497
SUBSTITUTED CHROMANONE OXIMES AND CHROMANONE OXIME ETHERS
Robert D. Irsay, Wilmington, Del., assignor to E. I. du Pont de Nemours and Company, Wilmington, Del., a corporation of Delaware
No Drawing. Continuation-in-part of application Ser. No. 734,549, June 5, 1968. This application Dec. 23, 1968, Ser. No. 786,443
Int. Cl. C07d 7/20; A61k 27/00
U.S. Cl. 260—345.2                    8 Claims

ABSTRACT OF THE DISCLOSURE

This disclosure teaches the preparation of chromanone oximes such as 7,8-dichloro-4-chromanone oxime by treating an appropriately substituted chromanone with hydroxylamine and chromanone oxime methyl ethers such as 7-chloro-6-fluoro-4-chromanone oxime methyl ether by treating an appropriately substituted chromanone with methoxyamine.

The compounds of this invention are useful as diuretics in warm-blooded animals.

CROSS-REFERENCE TO RELATED APPLICATIONS

This application is a continuation-in-part of my copending application Ser. No. 734,549, filed June 5, 1968, now abandoned, which in turn is a continuation-in-part of my application Ser. No. 580,606, filed Sept. 20, 1966, now abandoned.

This invention relates to substituted chromanone oximes, to substituted chromanone oxime methyl ethers and to their use as diuretics.

More particularly, this invention refers to 7-substituted-4 - chromanone oximes, 6,7-disubstituted-4-chromanone oximes, 7,8-disubstituted-4-chromanone oximes, 7 - substituted-4-chromanone oxime methyl ethers, 6,7-disubstituted-4-chromanone oxime methyl ethers and 7,8-disubstituted-4-chromanone oxime methyl ethers.

According to this invention, I have discovered a novel class of compounds which are useful in pharmaceutical applications. Particularly, they are diuretic agents as shown by their ability to increase urine volume and electrolyte output in rats and dogs. These novel compounds also exhibit pharmacological activity as anti-hypertensive agents.

The compounds of this invention have the formula (1) 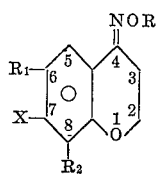

where

R is hydrogen or methyl;
$R_1$ and $R_2$ can be the same or different and are each selected from the group consisting of hydrogen, bromine, fluorine or chlorine, with the limitation that at least one of $R_1$ and $R_2$ must be hydrogen; and
X is bromine or chlorine.

Within the overall scope of the compounds of this invention, those compounds of Formula 1 are preferred in which R is methyl because the improved chemical stability of these ethers allows formulations of this invention that have a longer shelf life and improved storage characteristics.

Most preferred of the compounds of this invention due to their outstanding diuretic activity are 7-chloro-6-fluoro-4-chromanone oxime methyl ether and 7-chloro-8-fluoro-4-chromanone oxime methyl ether.

The substituted chromanone oximes or substituted chromanone oxime ethers of this invention are prepared by reacting the appropriately substituted chromanone with hydroxylamine or methoxyamine in a suitable solvent such as water, aqueous acetic acid, aqueous lower alkanols, dioxane, dimethylformamide, etc. at temperatures ranging from 20° C. to 100° C.

The appropriately substituted chromanones are prepared by ring closure of the correspondingly substituted 3-phenoxypropionic acids usually employing a strong acid such as sulfuric or hydrofluoric or polyphosphoric acid at a temperature of 0° C. to about 180° C. The starting material 3-phenoxypropionic acids can be readily prepared by the condensation of the appropriate substituted alkali phenolates with β-propiolactone in a solvent medium, preferably dimethylformamide, or water or other suitable reactions known for making compounds of this general class.

Illustrative of the compounds of this invention are the following:

7-chloro-4-chromanone oxime
7-bromo-4-chromanone oxime
7,8-dichloro-4-chromanone oxime
6,7-dichloro-4-chromanone oxime
7-chloro-6-fluoro-4-chromanone oxime
7-bromo-6-fluoro-4-chromanone oxime
7-chloro-8-fluoro-4-chromanone oxime
7-chloro-4-chromanone oxime methyl ether
7-bromo-4-chromanone oxime methyl ether
7-chloro-8-fluoro-4-chromanone oxime methyl ether
7,8-dichloro-4-chromanone oxime methyl ether
6,7-dichloro-4-chromanone oxime methyl ether
7-chloro-6-fluoro-4-chromanone oxime methyl ether
7-bromo-6-fluoro-4-chromanone oxime methyl ether
8-bromo-7-chloro-4-chromanone oxime methyl ether
6-bromo-7-chloro-4-chromanone oxime methyl ether A better understanding of the invention will be gained from the following examples which illustrate the various features of the invention.

Example 1.—6,7-dichloro-4-chromanone oxime

To a stirred suspension of 1 mole of sodium hydride in 1 liter dimethylformamide is added a solution of 1 mole of 3,4-dichlorophenol in 800 ml. of dimethylformamide. When hydrogen evolution is complete, the solution is warmed to 100° C. and 1 mole of β-propiolactone is added. The reaction mixture is kept at 100° C. for two hours. It is then cooled and poured on a mixture of 1 kg.

ice and 1.2 moles of concentrated hydrochloric acid. The product separating is dissolved in either. The ether solution is washed 4 times with an equal volume of water, then is extracted with sodium carbonate solution. The aqueous solution of the sodium salt of 3-(3,4-dichlorophenoxy)propionic acid is acidified with hydrochloric acid. The product is collected by filtration and dried. Following recrystallization from benzene 124 gm. of acid is obtained, M.P. 112–114° C.

*Analysis.*—Calc. (percent): C, 46.00; H, 3.43; Cl, 30.18. Found (percent): C, 46.13; H, 3.45; Cl, 29.52.

5 grams of the above product, 3-(3,4-dichlorophenoxy)-propionic acid, is stirred in 50 ml. of liquid hydrogen fluoride surrounded by a solid carbon dioxide/acetone bath. This slurry is allowed to stir overnight without replenishing the cooling bath. The hydrogen fluoride is removed by a stream of air. The residual solid is taken up in ether and is washed with 10% aqueous sodium carbonate solution. The organic layer is dried over anhydrous magnesium sulfate and the solvent is stripped. The crude product is recrystallized from ethanol with the aid of decolorizing charcoal to give 3.5 g. of 6,7-dichloro-4-chromanone, M.P. 131–132.5° C.

*Analysis.*—Calc. (percent): C, 49.80; H, 2.79; Cl, 32.68. Found (percent): C, 50.04; H, 2.90; Cl, 31.90.

9 grams of 6,7-dichloro-4-chromanone is added to a solution of hydroxylamine, prepared by mixing 13.5 ml. of 5 N aqueous solution of hydroxylamine hydrochloride, 13.5 ml. of 5 N aqueous sodium acetate solution and 10 ml. of ethanol, and the reaction mixture is refluxed for two hours. The product is collected by filtration and is recrystallized from ethanol, with the aid of decolorizing charcoal, giving 8.7 g. of 6,7-dichloro-4-chromanone oxime, M.P. 194–5° C.

*Analysis.*—Calc. (percent): C, 46.59; H, 3.04; Cl, 30.56; N, 6.04. Found (percent): C, 46.52; H, 3.01; Cl, 31.07; N, 5.98.

By substituting the following reactants for the 3,4-dichlorophenol employed above, one obtains the following products:

Reactant:                            Product
2-bromo-3-chlorophenol ____ 8 - bromo - 7-chloro-4-chromanone oxime.
3-chloro-4-fluorophenol ____ 7 - chloro - 6-fluoro-4-chromanone oxime.

Example 2.—7,8-dichloro-4-chromanone oxime

To a stirred solution of 0.5 mole of sodium hydroxide in 200 ml. of water, 0.5 mole of 2,3-dichlorophenol is added and the solution warmed to 100° C. 36 g. of β-propiolactone is added over a period of one minute and the solution is kept at 100° C. following the addition. The solution is then cooled to room temperature and 500 ml. of concentrated aqueous hydrochloric acid is added to it dropwise, with stirring. The resultant mixture is extracted with ether. The ether solution is extracted three times with 300 ml. of a 10% solution of sodium bicarbonate. The aqueous extract is acidified with hydrochloric acid and the precipitated solid is collected by filtration and dried. The crude material, on recrystallization from benzene, gives 60.0 g. of 3-(2,3-dichlorophenoxy)propionic acid, M.P. 145.0–146.5° C.

5 grams of 3-(2,3-dichlorophenoxy)propionic acid thus produced is stirred in 500 ml. of liquid hydrogen fluoride surrounded by a solid carbon dioxide/acetone bath. The slurry is allowed to stir overnight with replenishing the cooling bath. The hydrogen fluoride is removed by a stream of air. The residual solid is taken up in ether and is washed with a 10% aqueous sodium carbonate solution. The organic layer is dried over anhydrous magnesium sulfate and the solvent is stripped. The crude product is recrystallized from the ethanol with the aid of decolorizing charcoal. The product obtained, 7,8-dichloro-4-chromanone, melts at 87–88° C.

*Analysis.*—Calc. (percent): C, 49.80; H, 2.85. Found (percent): C, 50.08; H, 3.05.

3.85 grams of 7,8-dichloro-4-chromanone obtained in the manner above is added to a solution of hydroxylamine prepared by mixing 13.5 ml. of a 5 N aqueous solution of hydroxylamine hydrochloride, 13.5 ml. of a 5 N aqueous sodium acetate solution and 10 ml. of ethanol and the reaction mixture is refluxed for 2 hours. The product is collected by filtration and is recrystallized from acetonitrile giving 2.6 g. of 7,8-dichloro-4-chromanone oxime, M.P. 215–216° C.

*Analysis.*—Calc. (percent): C, 46.59; H, 3.04; N, 6.04; Cl, 30.57. Found (percent): C, 46.66; H, 3.07; N, 6.00; Cl, 30.34.

Example 3.—7-bromo-6-fluoro-4-chromanone

A solution of trifluoroperoxyacetic acid is prepared by the dropwise addition of 100 ml. trifluoroacetic anhydride to an ice-cold suspension of 16.4 ml. of 90% hydrogen peroxide in 100 ml. methylene chloride. This solution is added over a period of one hour to a cooled, stirred suspension of 260 g. dry, finely-ground disodium hydrogen phosphate in a mixture of 300 ml. methylene chloride and 61.8 g. of 3-bromo-4-fluoroacetophenone. Following the addition, the mixture is slowly warmed to reflux with vigorous stirring, and kept refluxing for 1 hour. After cooling and filtration, the filtrate is washed with 10% sodium carbonate solution and the organic layer is dried over MgSO$_4$. The solvent is stripped and the residue is warmed to boiling with a solution of 20 g. NaOH in 250 ml. water and 50 ml. ethanol. After cooling the solution is acidified with aqueous hydrochloric acid and steam distilled. The steam distillate is extracted with ether and the organic layer is dried over anhydrous magnesium sulfate. Following removal of the ether the semisolid residue is distilled through a spinning band column and the fraction boiling at 78° 0.5 mm./Hg is the 3-bromo-4-fluorophenol.

*Analysis.*—Calc. (percent): C, 37.73; H, 2.11. Found (percent): C, 36.88; H, 2.60.

The 3-bromo-4-fluorophenol is converted to 3-(3-bromo-4-fluorophenoxy)propionic acid in the manner described in Example 1 by substituting it for the 3,4-dichlorophenol in that example. The crude acid is treated with liquid hydrogen fluoride in the manner described and the product obtained is recrystallized from methanol to give 7-bromo-6-fluoro-4-chromanone, M.P. 147–149° C.

Example 4.—7-bromo-6-fluoro-4-chromanone oxime 7-bromo-6-fluoro-4-chromanone oxime is prepared in the manner described in Example 1, substituting 7-bromo-6-fluoro-4-chromanone for 6,7-dichloro-4-chromanone.

The crude product is recrystallized from benzene, M.P. 187–188° C.

*Analysis.*—Calc. (percent): C, 41.56; H, 2.71; Br, 30.73; N, 5.39. Found (percent): C, 41.59; H, 2.93; Br, 30.24; N, 5.20.

Example 5.—7,8-dichloro-4-chromanone oxime methyl ether 6.2 g. of methoxyamine hydrochloride and 6.1 g. of anhydrous sodium acetate are dissolved in 20 ml. water. 10 g. of 7,8-dichloro-4-chromanone and 20 ml. of ethanol are added and the mixture is refluxed for 2 hours. The mixture is cooled, is extracted with ether and the ether extract is washed with water and is dried over anhydrous magnesium sulfate. The solvent is removed under reduced pressure and the residue is recrystallized from methanol to give 7.9 g. of 7,8-dichloro-4-chromanone oxime methyl ether, M.P. 110–111° C.

*Analysis.*—Calc. (percent): C, 48.79; H, 3.69; N, 5.69. Found (percent): C, 48.76; H, 3.73; N, 5.69.

Example 6.—7-chloro-4-chromanone oxime methyl ether 2.75 g. of methoxyamine hydrochloride is dissolved in 10 ml. of water and added to a solution of 4.5 g. sodium acetate trihydrate in 10 ml. of water. To the resulting solution 9.2 g. of 7-chloro-4-chromanone and 20 ml. of ethanol are added and the mixture is refluxed for 2 hours. After cooling the mixture is extracted with ether. The ether extract is washed with water, dried over anhydrous magnesium sulfate. The solvent is removed under reduced pressure and the residue is recrystallized from methanol with the aid of decolorizing charcoal. The 3.6 g. of 7-chloro-4-chromanone oxime methyl ether obtained in this manner melts at 72–72.5° C.

Analysis.—Calc. (percent): C, 56.74; H, 4.76; Cl, 16.75; N, 6.62. Found (percent): C, 56.49; H, 4.91; Cl, 16.27; N, 6.60.

Example 7.—6,7-dichloro-4-chromanone oxime methyl ether 3.52 g. of methoxyamine hydrochloride is dissolved in 15 ml. of 5 M aqueous sodium acetate solution and 5 g. of 6,7-dichloro-4-chromanone is added followed by 15 ml. of ethanol. The mitxure is refluxed for 2 hours. The cooled mixture is extracted with ether. The ether extract is washed with water, and dried over anhydrous magnesium sulfate. The solvent is removed under reduced pressure and the residue is recrystallized from ethanol to yield 4.82 g. of 6,7-dichloro-4-chromanone oxime methyl ether, M.P. 112–113° C.

Analysis.—Calc. (percent): C, 48.79; H, 3.69; Cl, 28.81; N, 5.69. Found (percent): C, 48.74; H, 3.60; Cl, 28.59; N, 5.68.

Example 8.—7-bromo-6-fluoro-4-chromanone oxime methyl ether 7-bromo-6-fluoro-4-chromanone oxime methyl ether is prepared in the manner described in Example 7 with 7-bromo-6-fluoro-4-chromanone replacing 6,7-dichloro-4-chromanone.

The crude product is recrystallized from methanol. The 7-bromo-6-fluoro-4-chromanone oxime methyl ether melts at 73–75° C.

Analysis.—Calc. (percent): C, 43.82; H, 3.31; Br, 29.16; N, 5.11. Found (percent): C, 44.17; H, 3.49; Br, 28.07; N, 4.99.

Example 9.—Preparation of 7-bromo-4-chromanone oxime methyl ether

This compound is prepared by the same method as described in Example 7 for the preparation of 6,7-dichloro-4-chromanone oxime methyl ether, except that 7-bromo-4-chromanone is used in place of 6,7-dichloro-4-chromanone.

The crude product is recrystallized from hexane, M.P. 77–78° C.

Analysis.—Calc. (percent): C, 46.89; H, 3.94; Br, 31.21; N, 5.47. Found (percent): C, 46.67; H, 3.92; Br, 29.84; N, 5.43.

Example 10.—7-bromo-4-chromanone oxime 7-bromo-4-chromanone oxime is prepared in the manner described in Example 1 except that 7-bromo-4-chromanone is used in place of 6,7-dichloro-4-chromanone. The compound melts at 149–150° C. after recrystallization from methanol.

Analysis.—Calc. (percent): C, 44.65; H, 3.33; Br, 33.01; N, 5.79. Found (percent): C, 44.51; H, 3.55; Br, 31.89; N, 5.65.

Example 11.—7-chloro-6-fluoro-4-chromanone oxime methyl ether 3.52 g. of methoxyamine hydrochloride is dissolved in 15 ml. of 5 M aqueous sodium acetate solution and 4 g. of 7-chloro-6-fluoro-4-chromanone is added followed by 10 ml. of ethanol. The mixture is refluxed for 2 hours, is cooled and is extracted with ether. The ether extract is washed with water and is dried over anhydrous magnesium sulfate. The solvent is removed under reduced pressure and the residue is recrystallized from methanol to yield 3.26 g. of 7-chloro-6-fluoro-4-chromanone oxime methyl ether, M.P. 85.5–87° C.

Analysis.—Calc. (percent): C, 52.30; H, 3.95; Cl, 15.44; N, 6.10. Found (percent): C, 52.52; H, 4.07; Cl, 15.65; N, 6.12.

The compounds of this invention can be administered to warm-blooded animals for diuretic and anti-hypertensive effect according to this invention by any suitable means. The preferred route of administration is by the oral route although in some instances, it may be more desirable to administer the active compound intramuscularly or rectally.

The dosage administered will be dependent upon age, health and weight of the recipient, the kind of concurrent treatment if any, frequency of treatment, and the nature of the effect desired. Generally, a daily dosage of active ingredient compound will be from about 0.1 to 60 mg. per kg. of body weight, although lower, such as 0.05 mg./kg. or higher amounts can be used. Ordinarily, from 1 to 40 mg./kg. and preferably 2 to 20 mg./kg. per day, in one or more applications per day, is effective to obtain the desired result.

The diuretic activity of the compounds of this invention is demonstrated in a test conducted as described below.

The subjects used for the test are male, Carworth Farms, CFE rats weighing between 80 and 130 grams (Mean ±10 grams in any one test). The animals are not fasted prior to the experiment but they are deprived of food and water during the test.

The quantity of test compound required for administration is dissolved or suspended in PVA-acacia medium. The PVA-acacia medium contains 1% polyvinyl alcohol, 5% acacia, U.S.P., 0.1% methyl paraben and the balance water. The concentration of active compound in the PVA-acacia medium is adjusted so that the desired dose is present in a volume of 1 ml. of formulation per 100 grams of body weight.

The test compounds are administered by incubation to groups of six rats at each of three dose levels (3 × increment). In addition 2 ml. of water per 100 grams of body weight is also administered to each test animal to produce uniform hydration of the test subject.

The animals are then placed in metabolism cages (three per cage) immediately after the test compound and water are administered. The cages are suspended over funnels fitted with feces separators and the total urine excreted by each group of six rats is collected over a period of four hours.

The urine volumes are recorded and the pH determined (Beckman Model G pH meter). The urine samples are stored in glass tubes at 5° C. until analyzed for sodium, potassium and chloride ion concentrations. Sodium and potassium are determined with a Baird-Atomic KY-1 flame photometer. Chloride is determined with an Aminco-Cotlove Chloride Titrator. The results are expressed as milliequivalents per sample.

The results of a number of 4-hour Urine and Electrolyte Excretion Tests run with PVA-acacia medium, chlorothiazide and acetazolamide are summarized in Table I.

The results of a 4-Hour Urine and Electrolyte Excretion Test run with the indicated compounds of this invention are reported in Table II. A comparison of the results reported in Table II with the results of known diuretic agents and with the vehicle used to administer the test compounds as reported in Table I demonstrates the diuretic activity of the compounds of this invention.

TABLE I

| Test compound | Oral dose, mg./kg. | 4-hour urine and electrolyte excretion * | | | | |
|---|---|---|---|---|---|---|
| | | Volume, ml. | pH | Meg./group | | |
| | | | | Na | K | Cl |
| Chlorothiazide | 10 | 9±5 | 6.3±0.2 | 0.6±0.3 | 1.1±0.6 | 1.1±0.6 |
| | 30 | 11±4 | 6.4±0.2 | 0.8±0.5 | 1.1±0.6 | 1.4±0.6 |
| | 100 | 16±4 | 6.4±0.3 | 1.6±0.5 | 1.9±0.9 | 2.5±0.7 |
| Acetazolamide | 1 | 10±5 | 7.7±0.3 | 0.9±0.6 | 1.3±0.3 | 0.8±0.2 |
| | 3 | 11±3 | 8.0±0.2 | 1.1±0.4 | 1.2±0.4 | 0.7±0.2 |
| | 10 | 15±6 | 8.0±0.3 | 1.7±0.6 | 1.6±0.5 | 0.9±0.2 |
| PVA-acacia medium | | 5±3 | 6.2±0.2 | 0.2±0.1 | 0.7±0.4 | 0.5±0.2 |

* Control data includes mean ± standard deviation.

TABLE II

| Test compound | Oral dose, mg./kg. | 4-hour urine and electrolyte excretion * | | | | |
|---|---|---|---|---|---|---|
| | | Volume, ml. | pH | Meg./group | | |
| | | | | Na | K | Cl |
| 7-chloro-4-chromanone oxime | 30 | 21 | 6.0 | 2.1 | 1.4 | 4.7 |
| | 100 | 37 | 6.2 | 3.7 | 1.7 | 5.5 |
| | 300 | 46 | 6.3 | 5.2 | 1.9 | 6.7 |
| 7,8-dichloro-4-chromanone oxime | 30 | 24 | 6.1 | 2.4 | 2.0 | 4.0 |
| | 100 | 47 | 6.3 | 6.0 | 2.6 | 7.4 |
| | 300 | 49 | 6.4 | 5.4 | 2.7 | 7.8 |
| 7-chloro-6-fluoro-4-chromanone oxime | 1 | 4 | 6.5 | 0.3 | 0.7 | 0.5 |
| | 3 | 6 | 6.1 | 0.3 | 1.7 | 0.9 |
| | 10 | 21 | 5.8 | 1.4 | 1.5 | 2.6 |
| 7-chloro-6-fluoro-4-chromanone oxime methyl ether | 1 | 3 | 6.7 | 0.3 | 0.6 | 0.4 |
| | 3 | 7 | 6.7 | 0.5 | 0.9 | 0.6 |
| | 10 | 5 | 6.6 | 0.4 | 0.9 | 0.7 |
| 7-chloro-6-fluoro-4-chromanone oxime methyl ether | 30 | 25 | 6.4 | 2.7 | 2.1 | 3.4 |
| | 100 | 40 | 6.3 | 4.5 | 2.4 | 5.2 |
| | 300 | 47 | 6.5 | 5.3 | 2.7 | 6.0 |
| 6,7-dichloro-4-chromanone oxime methyl ether | 1 | 1 | 6.6 | 0.1 | 0.3 | 0.1 |
| | 3 | 3 | 7.0 | 0.0 | 0.0 | 0.0 |
| | 10 | 5 | 6.6 | 0.1 | 0.2 | 0.2 |
| 6,7-dichloro-4-chromanone oxime methyl ether | 10 | 5 | 6.7 | 0.3 | 0.8 | 0.6 |
| | 30 | 10 | 6.6 | 0.9 | 1.2 | 1.4 |
| | 100 | 27 | 6.3 | 2.8 | 1.5 | 3.5 |
| 7-chloro-4-chromanone oxime methyl ether | 30 | 10 | 6.2 | 1.0 | 1.4 | 1.7 |
| | 100 | 19 | 6.2 | 2.2 | 1.7 | 3.1 |
| | 300 | 33 | 6.7 | 3.8 | 2.1 | 4.4 |
| 7,8-dichloro-4-chromanone oxime methyl ether | 1 | 2 | 6.5 | 0.1 | 0.7 | 0.3 |
| | 3 | 2 | 6.6 | 0.2 | 0.5 | 0.3 |
| | 10 | 4 | 6.5 | 0.4 | 1.0 | 0.8 |
| 7,8-dichloro-4-chromanone oxime methyl ether | 30 | 15 | 6.3 | 1.9 | 1.9 | 2.5 |
| | 100 | 33 | 6.3 | 4.0 | 2.4 | 4.8 |
| | 300 | 45 | 6.3 | 5.0 | 2.5 | 5.9 |
| 7-bromo-4-chromanone oxime | 30 | 23 | 6.1 | 1.8 | 1.6 | 2.8 |
| | 100 | 41 | 6.4 | 3.8 | 2.0 | 5.1 |
| | 300 | 60 | 6.4 | 6.4 | 2.5 | 7.9 |
| 7-bromo-4-chromanone oxime methyl ether | 30 | 8 | 6.5 | 0.8 | 1.3 | 1.4 |
| | 100 | 23 | 6.6 | 2.5 | 2.6 | 3.5 |
| | 300 | 40 | 6.6 | 4.7 | 3.0 | 5.9 |
| 7-bromo-6-fluoro-4-chromanone oxime | 10 | 23 | 6.1 | 1.7 | 2.3 | 2.9 |
| | 30 | 42 | 6.2 | 3.9 | 2.4 | 5.6 |
| | 100 | 60 | 6.6 | 5.9 | 2.8 | 7.7 |
| | 300 | 64 | 6.6 | 6.5 | 2.7 | 8.4 |
| 7-bromo-6-fluoro-4-chromanone oxime methyl ether | 10 | 22 | 6.5 | 1.6 | 2.6 | 2.9 |
| | 30 | 35 | 6.3 | 2.7 | 2.0 | 4.3 |
| | 100 | 47 | 6.1 | 4.5 | 2.3 | 6.2 |
| | 300 | 58 | 6.6 | 6.0 | 3.3 | 7.9 |

The active ingredient of this invention can be employed in useful compositions according to the present invention in such dosage forms as tablets, capsules, powder packets, or liquid solutions, suspensions or elixirs, for oral administration or liquid solutions for parenteral use, and in certain cases, suspensions for parenteral use (except intravenous). In such compositions the active ingredient will ordinarily be present in an amount of at least 0.02% by weight based on the total weight of the composition and not more than 99% by weight.

In view of the insoluble nature of the compounds of this invention, particularly those compounds of Formula 1 where R is $CH_3$ the particle size of the bulk drug must be examined prior to dosage form preparation. For example, it has been observed for some of these compounds that when the average particle diameter is reduced, the biological activity increases.

The use of surfactants to aid in the wetting of the particle helps to maintain the particle size-activity relationship. In general, for the water-insoluble compounds of this invention, the average particle diameter should be reduced to 5 microns or less.

Besides the active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 and 99–50% of an excipient such as starch, lactose, mannitol, calcium sulfate, microcrystalline cellulose, talc, magnesium stearate and finely divided silicon dioxide. In another embodiment the active ingredient is tableted. In yet another embodiment, the active ingredient is put into powder packets and employed. These capsules, tablets and powders will generally constitute from about 1% to about 95% and preferably from 1% to 50% by weight of active ingredient. These dosage forms preferably contain from about 5 to about 1000 mg. of active ingredient, with from about 10 to about 250 most preferred.

In still another embodiment, the active ingredient may be formualted into suppositories for rectal use. Such suppositories will generally constitute from about 1% to 50% and preferably from 1% to 25%, by weight, of the active ingredient, admixed with a suitable base. Suitable bases are theobroma oil, mixtures of polyethylene glycols, wax-oil mixtures (for use in preparing gelatin rectal capsules), and mixtures of triglycerides of saturated vegetable fatty acids with varying proportions of partial glycerides.

The pharmaceutical carrier can, as previously indicated, be a liquid such as water and oils, including those of petroleum, animal, vegetable or synthetic origin, for example, peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable preparations.

As mentioned above, oral administration can be in a suitable suspension or syrup, in which the active ingredient ordinarily will constitute from about 0.02 to 10%, and preferably about 0.1 to 1% by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention.

Example 12

A large number of unit capsules are prepared for oral administration by filling standard two-piece hard gelatin capsules weighing about 80 mg. each with 50 mg. of powdered 6,7-dichloro-4-chromanone oxime methyl ether and 400 mg. of a mixture consisting of 89 parts anhydrous lactose, 8 parts talc, 2 parts magnesium stearate and 1 part polyoxyl 40 stearate.

Example 13

A large number of unit capsules are prepared for oral administration by filling soft gelatin capsules with a suspension of 6,7-dichloro-4-chromanone oxime in a mixture of soybean oil and polysorbate 80 (95:5).

Example 14

Another dosage unit contains 50 mg. of active ingredient, 8 mg. of gelatin, 6 mg. of magnesium stearate, 150 mg. of mannitol, 12 mg. of surfactant and 20 mg. of corn starch, mixed and formed into a tablet by conventional tableting procedures. Slow release tablets can also be used, by applying appropriate coatings.

Example 15

A flavored syrup containing 1 mg. of 6,7-dichloro-4-chromanone oxime in 5 ml. can be prepared by dissolving the compound in a flavored solution of sorbitol containing up to 50% of ethyl alcohol USP so that the final concentration is 0.02% weight/volume.

Example 16

Suppositories are prepared by dispersing 50 mg. of powdered 6-fluoro-7-chloro-4-chromanone oxime methyl ether in a mixture of 2.25 gm. of polyethylene glycol 1,000 and 0.75 gm. of polyethylene glycol 4,000, pouring into an appropriate mold and cooling to form the suppository.

Example 17

6,7-dichloro-4-chromanone oxime is formulated conveniently in ethyl alcohol USP-water in 0.1% by weight concentration for oral administration, with and without a flavoring agent, and a coloring agent, etc.; and in 100 milligram amounts in standard two-piece hard gelatin capsules with a diluent such as starch, mannitol or lactose, for oral administration. In pharmacologic applications it is administered in these dosage forms at dosage levels in the range of 10 to 250 milligrams for treatment of physiologic conditions as described above.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin text mentioned above.

The disclosure herein should not be taken as a recommendation to use the disclosed invention in any way without full compliance with Food and Drug Laws and other laws and governmental regulations which may be applicable.

I claim:
1. A compound of the formula:

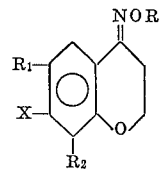

where

R is hydrogen or methyl;
$R_1$ and $R_2$ can be the same or different and are each selected from the group consisting of hydrogen, bromine, fluorine or chlorine, with the limitation that at least one of $R_1$ and $R_2$ must be hydrogen; and
X is bromine or chlorine.

2. A compound of the formula:

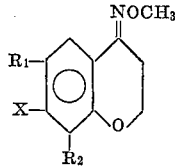

where $R_1$ and $R_2$ can be the same or different and are each selected from the group consisting of hydrogen, bromine, fluorine or chlorine, with the limitation that at least one of $R_1$ and $R_2$ must be hydrogen; and
X is bromine or chlorine.

3. A compound of the formula

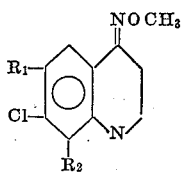

where $R_1$ and $R_2$ can be the same or different and are each selected from the group consisting of hydrogen, bromine, fluorine or chlorine, with the limitation that at least one of $R_1$ and $R_2$ must be hydrogen.

4. A compound of the formula

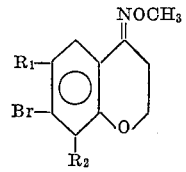

where $R_1$ and $R_2$ can be the same or different and are each selected from the group consisting of hydrogen, bromine, fluorine, or chlorine, with the limitation that at least one of $R_1$ and $R_2$ must be hydrogen.

5. The compound of claim 1 which is 7-chloro-6-fluoro-4-chromanone oxime.

6. The compound of claim 1 which is 7-chloro-6-fluoro-4-chromanone oxime methyl ether.

7. The compound of claim 1 which is 7-chloro-8-fluoro-4-chromanone oxime.

8. The compound of claim 1 which is 7-chloro-8-fluoro-4-chromanone oxime methyl ether.

References Cited

Thorn: Can. J. Chem., vol. 30, pp. 224–5 (1952).
Dann et al.: Ann. der Chemie, vol. 587, pp. 16–37 (1964).
Powell: J. Amer. Chem. Soc., vol. 45, pp. 2708–11 (1923).

HENRY R. JILES, Primary Examiner

J. M. FORD, Assistant Examiner

U.S. Cl. X.R.

424—283

PO-1050
(5/69)

UNITED STATES PATENT OFFICE
CERTIFICATE OF CORRECTION

Patent No. 3,510,497          Dated  May 5, 1970

Inventor(s)  Robert D. Irsay

It is certified that error appears in the above-identified patent and that said Letters Patent are hereby corrected as shown below:

The structure appearing in Claim 3, at column 11 should read:

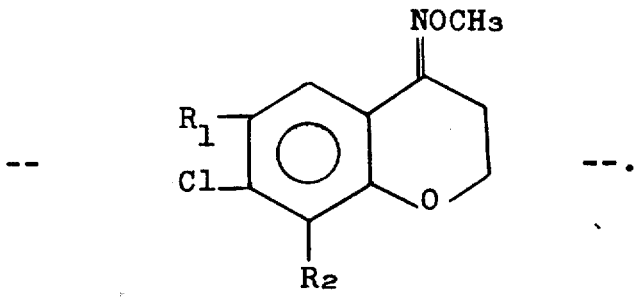

SIGNED AND
SEALED
SEP 22 1970

(SEAL)
Attest:

Edward M. Fletcher, Jr.
Attesting Officer

WILLIAM E. SCHUYLER, JR.
Commissioner of Patents